J. HAMILL.
Securing Cap-Plates to Lock-Cases.

No. 147,258.          Patented Feb. 10, 1874.

Witnesses
James E. Kay
Frederick Standish

Inventor
John Hamill
by his attorneys
Bakewell & Kerr

UNITED STATES PATENT OFFICE.

JOHN HAMILL, OF PITTSBURG, PENNSYLVANIA.

IMPROVEMENT IN SECURING CAP-PLATES TO LOCK-CASES.

Specification forming part of Letters Patent No. 147,258, dated February 10, 1874; application filed January 9, 1874.

*To all whom it may concern:*

Be it known that I, JOHN HAMILL, of Pittsburg, in the county of Allegheny and State of Pennsylvania, have invented a new and useful Improvement in Locks; and I do hereby declare the following to be a full, clear, and exact description thereof, reference being had to the accompanying drawing, forming a part of this specification, in which—

Figure 1:
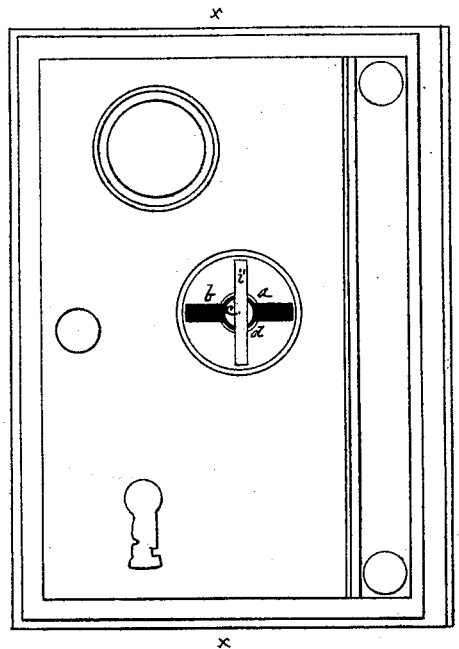
Figure 2:
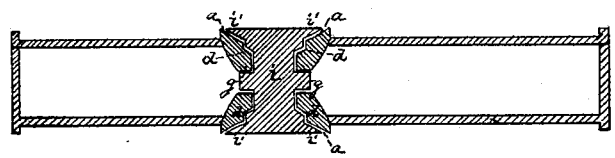

Figure 1 is a face view of my improved lock, and Fig. 2 is a section through $x\ x$.

Like letters of reference indicate like parts in each.

My invention relates to an improvement in locks.

Heretofore the face-plate and lock-case of ordinary locks have usually been secured together by a screw passing through the face and screwing into a threaded socket in the case. This mode of securing the parts necessitates the subsequent operation of tapping and threading the lock for the reception of the screw after the parts are cast. By my improvement this separate operation is rendered unnecessary.

The improvement consists in casting the lock-case and face-plate of the lock each with a slot in it running across a suitably-shaped seat. The slots are made at corresponding points, and are directly opposite each other when the parts are adjusted. The two parts thus formed are secured together by a tang bolt or rivet, the ends of the bolt or rivet being passed through the slots and then turned so as to engage the surface of each seat.

To enable others skilled in the art to make and use my invention, I will describe it more fully.

In Fig. 1, $a$ represents the seat in the face-plate of the lock. This seat has a slot, $b$, extending across it. At the bottom of the seat the slot is shaped so as to allow the cylindrical portion $c$ of the tang bolt or rivet to fit into it, allowing it to turn around easily. This portion of the seat has a rim or flange, as at $d$. The bolt or rivet $i$ has a tang, $i'$, at each end, which seats on the flange $d$. On the lock-case is a similar seat and slot to that on the face-plate, corresponding with it in position so as to be directly opposite to it. The body of the tang bolt or rivet at its center has a circular projection or bead, $g$, Fig. 2. This bead fits between the two opposite flat surfaces $f$ on the interior faces of the lock. The tangs $i'$, Fig. 2, of the bolt or rivet are shaped so as to pass through the slots.

By passing the tangs $i'$ of the bolt or rivet through the slots $b$, (the parts being in proper position,) and turning them so as to engage the surface of each seat, the lock-case and face-plate will be firmly secured together.

If this fastening be applied to a reversible knob-latch, and it is desired to reverse the latch, it can be done by turning the bolt and releasing the face-plate, which is removed, thus freeing the latch-head and allowing it to be reversed.

It will readily be seen that by making the fastening as described, the parts can be formed entirely by casting, no subsequent tapping and threading being required.

What I claim as my invention, and desire to secure by Letters Patent, is—

The method of fastening the parts of a lock by means of a tang-rivet, the heads or tangs being extended through and turned across suitable slots cast in the opposite faces of the lock, substantially as described.

In testimony whereof I, the said JOHN HAMILL, have hereunto set my hand.

JOHN HAMILL.

Witnesses:
T. B. KERR,
L. C. FITLER.